US006082018A

United States Patent [19]

Wells

[11] Patent Number: 6,082,018

[45] Date of Patent: Jul. 4, 2000

[54] PRE-MARKED MAKEREADY TAPE

[76] Inventor: Harold T. Wells, 1233 Tipton Station Rd., Knoxville, Tenn. 37920

[21] Appl. No.: 09/018,169

[22] Filed: Feb. 3, 1998

Related U.S. Application Data

[60] Continuation-in-part of application No. 08/719,542, Sep. 25, 1997, Pat. No. 5,722,178, which is a division of application No. 08/438,380, May 10, 1995, abandoned.

[51] Int. Cl.[7] .................................. G01B 3/10; B41F 5/04

[52] U.S. Cl. .................................. 33/759; 33/758; 33/614; 33/DIG. 1

[58] Field of Search .......................... 33/758, 759, DIG. 1

[56] References Cited

U.S. PATENT DOCUMENTS

| | | | |
|---|---|---|---|
| 2,932,897 | 4/1960 | Huber . | |
| 3,621,579 | 11/1971 | Dubitsky | 33/758 |
| 3,797,120 | 3/1974 | Byne | 33/137 R |
| 4,177,730 | 12/1979 | Schriber et al. | 101/248 |
| 4,351,113 | 9/1982 | Eggertsen et al. | 33/137 R |
| 4,412,490 | 11/1983 | Grosshauser | 101/219 |
| 4,425,391 | 1/1984 | Wilson | 33/758 |
| 4,569,285 | 2/1986 | Forno et al. | 101/248 |
| 4,654,978 | 4/1987 | Wolford, Jr. | 33/DIG. 1 |
| 4,716,799 | 1/1988 | Hartmann | 83/42 |
| 4,905,598 | 3/1990 | Thomas et al. | 101/219 |
| 5,012,590 | 5/1991 | Wagner et al. | 33/759 |
| 5,567,514 | 10/1996 | Gold | 33/758 |
| 5,666,737 | 9/1997 | Ryan, III | 33/759 |

FOREIGN PATENT DOCUMENTS

| | | | |
|---|---|---|---|
| 3529958 | 2/1987 | Germany | 33/758 |
| 1226055 | 3/1971 | United Kingdom | 33/758 |

*Primary Examiner*—Christopher W. Fulton
*Assistant Examiner*—Quyen Doan
*Attorney, Agent, or Firm*—Pitts & Brittian, P.C.

[57] ABSTRACT

A pre-marked makeready tap for use in setting and regulating the position of webbing in a printing press. The pre-marked makeready tape having a top side defining at least a first mark and a second mark spaced apart a distance equal to a whole multiple page length of printed matter and a bottom side having an activatable, but non-activated adhesive member substantially disposed about the bottom side for securing to the continuous web The adhesive member is selectively activated for attaching an end of the makeready tape to an end of the continuous web on the roll of continuous webbing proximate to the printing unit, and feeding the web through the press for commencement or resumption of the printing process.

11 Claims, 5 Drawing Sheets

PRE-MARKED MAKEREADY TAPE

This continuation-in-part application discloses and claims subject matter disclosed in my earlier filed pending application, Ser. No. 08/719,542, filed on Sep. 25, 1997, now U.S. Pat. No. 5,722,178, which is a divisional application of my earlier filed application, Ser. No. 08/438,380, filed on May 10, 1995, now abandoned.

TECHNICAL FIELD

This invention relates generally to a pre-marked makeready tape for setting and regulating the position of webbing in a printing press. More particularly, this invention relates to a pre-marked makeready tape for setting and regulating the accuracy of the position of the continuous web in the newspaper printing process. Although described specifically for the use in the newspaper printing process, the tape is applicable in various other printing processes as well.

BACKGROUND ART

In the field of printing, it is well-known that continuous web printing presses are set up for high volume printing of such items as newspapers, business forms and event admission tickets. It is also well-known that there are various methods for facilitating the transmission of continuous web through the printing press to generate these documents. Further, it is well-known in the art of newspaper printing, that the makeready processes currently employed for the continuous web printing press involve trial and error adjustment to produce a properly printed, cut and folded newspaper page. For example, current makeready processes require that the print ink is turned on all of the printing units after the webs from the units have been led to the folder for the makeready for an edition of the newspaper. The printing presses are then run up to speed and a proof of the complete newspaper is generated on the leads from all of the printing units. The printing presses are then stopped and trial adjustments are made with the compensators to center the image on the web and another proof is taken. This process is repeated until all of the margins are compensated and the folder is not cutting into the image. The makeready is changed to accommodate the many page section and page color combinations required to produce a newspaper.

Many production problems result in current makeready processes. Presses may be started before the ink begins to run, the ink may dry out before completion of a run, overruns can occur and presses may malfunction. Problems also arise where, in correcting for a web break, a pressman mistakenly takes the web on a different lead other than the one that was compensated for (for example, over or under a different pipe roller). The primary consequence of such problems is that production is frequently interrupted. These consequences propagate, even after the problems are corrected, as production is resumed at a much slower pace. The common end result of such processes is that hundreds of pages of newspaper webbing, a significant quantity of newspaper ink, and many man-hours of labor are each wasted for each interrupted production run.

A major goal of newspaper printers is to reduce the unnecessary waste of raw materials and human resources associated with the newspaper printing process. A second goal of newspaper printers is to reduce the necessity for and manpower expended in making adjustments to the web and/or the printing presses when the web is either improperly positioned or interrupted. In view of these goals, it is thereby desirable to conserve valuable natural resources, reduce overhead and expenses, and streamline the time required to set-up or reset continuous web printing press operations by employing a method for effectively and efficiently setting and regulating the accuracy of the position of the continuous web in the continuous web printing process using a pre-marked makeready tape.

Other devices have been produced to assist in performance of high volume, continuous web printing. Typical of the art are those devices disclosed in the following U.S. Patents:

| Pat. No. | Inventor(s) | Issue Date |
|---|---|---|
| 2,932,897 | E. W. Huber | Jun. 26, 1958 |
| 3,797,120 | Z. P. Byne | Mar. 19, 1974 |
| 4,177,730 | L. Schriber, et al. | Dec 11, 1974 |
| 4,351,113 | C. C. Eggersten, et al. | Sep. 28, 1982 |
| 4,412,490 | H. K. Grosshauser | Nov 01, 1983 |
| 4,569,285 | M. Forno, et al. | Feb 11, 1986 |
| 4,716,799 | D. Hartmann | Jan 01, 1988 |
| 4,905,598 | H. Thomas | Mar 06, 1990 |
| GB1226055 | G. E. S. Ciancimino | Mar. 24, 1971 |

The method and apparatus for web printing disclosed by Schriber, et al., in the '730 patent is a total registration system for many different and optionally used mechanisms of the business form press. The makeready adjustments of this system are set using adjustable mechanisms and indicators which relate the setting of the indicators to a zero position before the web is threaded through all of the stations. This particular system also requires completion of a composition and a calculation scheme prior to actual operation of the press. It is also unidirectional and requires the expense of several runs of web prior to the final setting of the press. This particular device lacks the flexibility of functioning without such adjustment indicators or composition and calculation schemes. Similarly, it lacks facility in setting and regulating the print to cut distance of webbing on the continuous web printing press.

The '490 patent issued to Grosshauser discloses a paper web guiding mechanism designed to provide a moveable paper web guide frame. This device is also designed to lend greater support to a press operator needing to access areas within the printing unit without the necessity of severing the paper web. As such, this particular printing press mechanism does not relate to the method of setting and regulating the accuracy of the position of webbing on the continuous web printing process that is the subject of the present invention.

The '285 patent issued to Fomo, et al., discloses a device for controllably shifting a compensator roller in a printing press to feed a web by means of a variable speed actuator. The focus of this device is compensator movement and manipulation. Given this focus on a printing press component, and its operation, this particular device bears no relation to the method of setting and regulating the accuracy of the position of webbing on the continuous web printing process.

The '799 patent issued to Hartmann discloses a machine and a method for automatic ticket dispensing whereby the machine automatically adjusts itself to the size of the ticket being dispensed. The device utilizes optic sensors, a controller and a cutter to detect, monitor and tailor ticket dimensions based on the distance between pre-determined perforation points. The requirement of optic sensors or electrically governed controller components and the use of preperforated printing media are functional limitations that restrict the use and adaptability of this device.

The '598 patent issued to Thomas et al. discloses a machine for processing continuous web sheets having bearings and casings for adjusting the nip between cylinders of a machine. The bearing arrangements of this machine are within auxiliary casings supported by the machine frame. This arrangement of the bearings and casings also allows for control of the flexure of the cylinders. Like the '285 patent issued to Forno, et al., this device relates to particular printing press components, and their operation, rather than the operation of the press in its entirety.

Finally, the '897 patent issued to Huber, the '120 patent to issued Byrne, the '113 patent issued to Eggersten, and the '055 patent issued to Ciancimino disclose tape devices which are distinguishable from the present invention. Huber discloses an expandable measuring tape which is selectively pre-weakened such that a series of slits are created in the tape and pre-determined sections of the tape surface are removable. Byne similarly discloses a sewing tape having a series of "elongated weakening cuts" to enable the separation of the tape into ribbons of predetermined thickness and provide for accurate top-stitching. Eggersten discloses a pressure sensitive, expandable, adhesively-backed measuring tape composed of rubber-matted crepe paper for measuring. And, Ciancimino discloses a "flexible graduated tape" having a centrally disposed metal stripping to preclude elongation for measuring in either English or metric units. None of these devices is designed or easily adapt to coordinate and adjust the orientation of two spaced points on a web printing press. None of these devices includes an adhesive surface which may be applied solely at the points of contact between the tape and the web surface, as opposed to their entire lengths. Nor are any of these devices composed of materials suitable for use in the web printing process.

Neither the Eggersten nor the Ciancimino tapes are applicable to either feeding webbing through a printing press as removal of the backing strips from either or both of these tapes is impractical, regardless of whether the removal of the backing strips occurs before or after such a tape is fed through a printing press. Moreover, even if feasibly removed and positioned in the press as described above, once exposed, the backing side of either the Eggersten or the Ciancimino tapes would immediately attach themselves to that part of the printing press against which they lay and tear apart when the press is set into motion. The end result is not only a defeat of the objective of compensating the web, but severe damage to the press and its parts caused by the accumulation of these tapes in those press parts. The tape devices of the Huber and Byne patents fail for identical reasons.

The indicia disposed on each of the referenced tapes does little more than confuse a pressman's task of centering printed media on a web page as they fail to facilitate the measurement of the appropriate length of webbing. The use of such tapes, consequently, would also extend the time required for a pressman to make an accurate determination of proper web page position. Greater manufacture and sale costs, due to the inclusion of minute measurements and the use of pressure sensitive adhesives, are a further consequence of the production of the referenced tapes. Moreover, the use of the referenced tapes would do little more than increase the waste resulting from their use in the web feeding and compensating process as the tapes themselves would constitute additional waste.

Therefore, it is an object of this invention to provide a pre-marked makeready tape for accurately setting and regulating webbing in the makeready and printing processes of a continuous web printing press.

It is an object of the present invention to provide a makeready tape having an adhesive surface which is selectively activatable, but not activated, such that each end of the makeready tape of any length of the tape is selectively adherable to the webbing and adherence problems of non-activated portions of the adhesive surface are obviated.

It is another object of this invention to provide a novel method for reducing web set-up waste by use of a makeready tape that is pre-marked marked at whole number page increments for page lengths of webbing as are commonly used in newspaper printing processes.

Further, it is an object of the present invention to provide a pre-marked makeready tape whose use obviates the need to turn on the ink wells and use the ink for trial compensating runs, as well as the use of webbing during those compensating runs.

It is an object of the present invention to provide a pre-marked makeready tape which enables the accurate setting of the press compensator for any press run, regardless of page or printing press length.

It is another object of the present invention to provide a pre-marked makeready tape which enables rapid and accurate adjustment of the printing press from one size of webbing page cut to another.

Additionally, it is an object of this invention to provide a pre-marked makeready tape for adjusting the web on the continuous web printing press at any time during the print process, regardless of cause, without the necessity of resetting the entire press.

Moreover, it is an object of this invention is to provide a pre-marked makeready tape which enables efficient and effective continuous web newspaper printing with a minimal expense of manpower and/or natural resources.

DISCLOSURE OF THE INVENTION

In accordance with the present invention, there is provided a pre-marked makeready tape for use in setting and regulating of webbing in a printing press. The pre-marked makeready tape includes a top side bearing marks which are disposed perpendicularly to the border of said tape and equidistantly spaced intervals equal to one page length of printed matter and a bottom side having an activatable, but non-activated, adhesive disposed about its surface. In one embodiment, the one page length interval is 23 $\frac{9}{16}$". Those skilled in the art will readily recognize that there are several additional commonly used cutoff sizes used for newsprint today and that the methods of the present invention is readily and easily adaptable to presses utilizing alternative cutoff dimensions. The marks on the top side of the pre-marked makeready tape are made by any preferred indelible marking source including pen, pencil, paint or a marker.

In accordance with the present invention, marks are also made on various components of the printing press at preferred locations proximate to the path defined by the continuous webbing. The printing press marks serve as reference points for regulating and adjusting the position of the web at any point during the printing process. In the preferred embodiment, such reference marks are made on the impression cylinder of the printing unit (at a point corresponding with the margin on the plate cylinder), on the angle bar and on the former. Those skilled in the art will easily recognize that such marks can also readily be employed in other combinations at other locations on the printing press. For instance, such marks may be employed as, and replace, existing engage and disengage marks on the plate cylinder. Alternatively, or additionally, the marks may be placed on the folding cylinder and/or cutting cylinder of the folder. As with the marks on the makeready tape, the marks on the printing press are also made by a preferred indelible marking source.

In the preferred embodiment, the pre-marked makeready tape is threaded through the impression and plate cylinders of the printing unit, about the compensators, and through the folder, including the former. The marks of the pre-marked makeready tape proximate to the former are first aligned with the marks on the former. The marks of the pre-marked makeready tape proximate to the impression cylinder are then compared to the marks on the impression cylinder. The compensators are then adjusted to insure exact alignment of the marks on the impression cylinder with the makeready tape marks on the tape proximate to the impression cylinder, thereby centering the image on the print web. Those skilled in the art will recognize that this procedure may be accomplished in alternative ways, including a reversal of the above-described alignment and adjustment steps. They will also recognize that other reference points may be employed in an identical manner with comparable efficiency and effectiveness. Those skilled in the art will further recognize the utility of this method when the web is interrupted during the printing process. Finally, they will equally appreciate the adaptability of this method, in alternative embodiments, for use with other press printing media.

BRIEF DESCRIPTION OF THE DRAWINGS

The above mentioned features of the invention will become more clearly understood from the following detailed description of the invention read together with the drawings in which.

BEST MODE FOR CARRYING OUT THE INVENTION

As discussed hereinafter, the present invention is applicable to a device for setting and regulating the disposition of print on a print medium. The method is especially applicable for many different types of printing applications. The invention described, for purposes of illustration, is applied for newspaper printing on a continuous web printing press.

Figure 1:
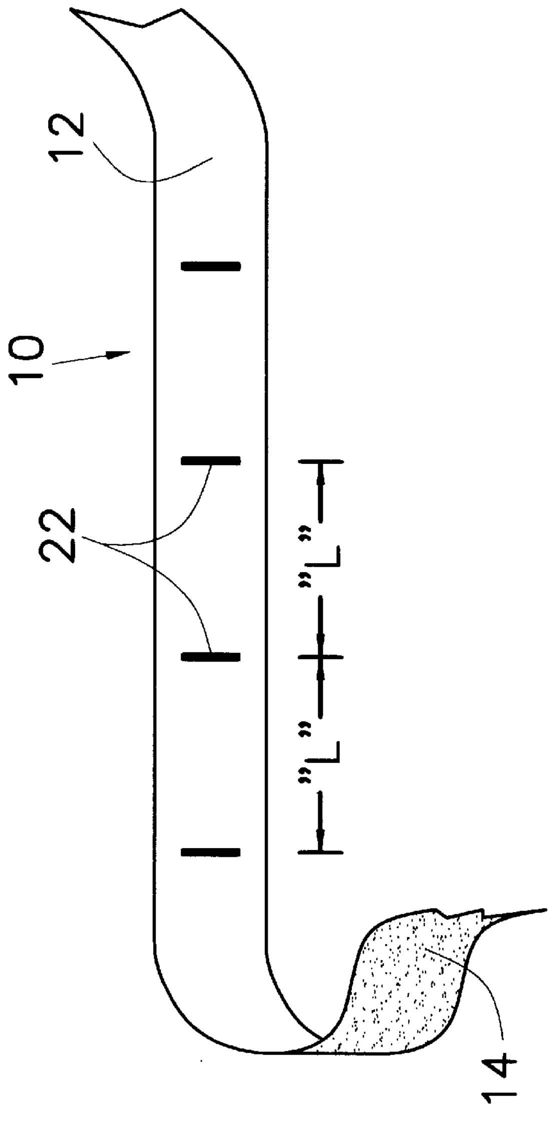
FIG. 1 is a plan view of the pre-marked makeready tape which is utilized conjunction with the method of the present invention.
Figure 2:
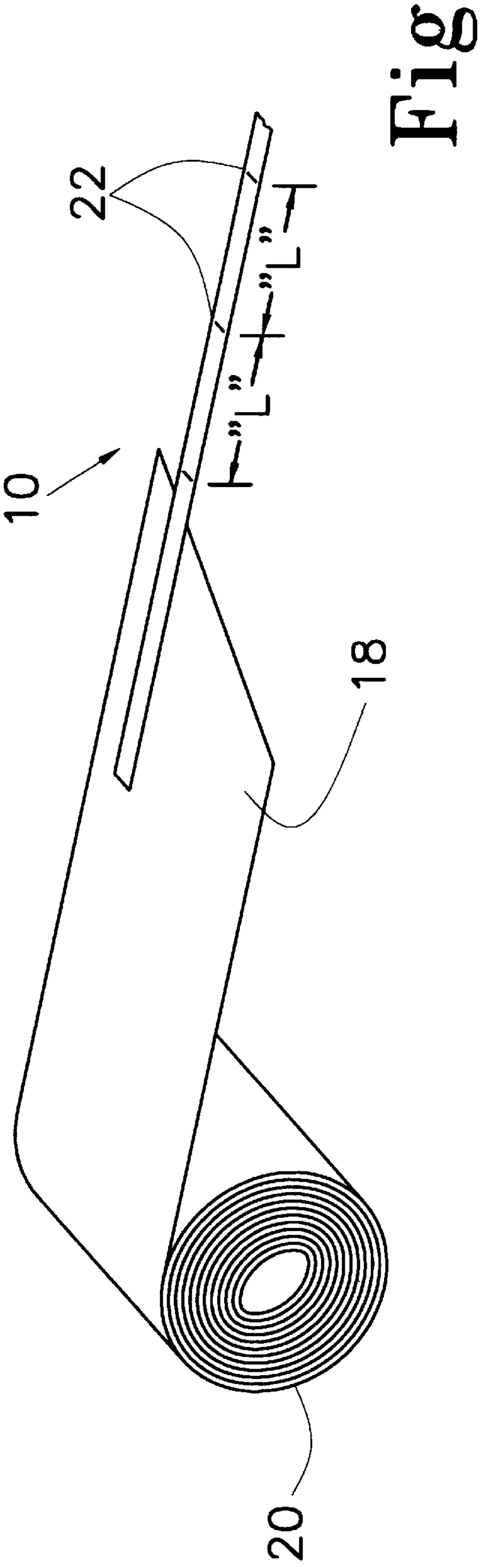
FIG. 2 is a perspective view of the pre-marked makeready tape adhesively attached at one end to the tapered end of a roll of continuous webbing, said makeready tape exhibiting the marks disposed at a distance “L” apart.

For an understanding of the pre-marked makeready tape 10, and particularly its utility in a continuous web printing press 16, reference is made to FIGS. 1 and 2, which depict a section of the pre-marked makeready tape 10 and said tape adhesively affixed at an end to the tapered end of the web 18. As FIG. 1 demonstrates, the pre-marked makeready tape 10 is composed of a top side 12 bearing marks 22 which are set apart by a pre-determined distance, “L”, such as 23 9⁄16", and are disposed in a perpendicular relation to the border of the makeready tape 10. The distance “L” is determined as one page length of printed matter.

While FIG. 1 provides an illustration of the preferred embodiment, the marks 22 depicted on the top side 12 of the makeready tape 10 may also be varied to conform to the requirements of other continuous web printing presses commonly used in the newspaper printing industry, including but not limited to page lengths of 21 ½", 22 ½" and 22 ¾". The marks 22 may be made using any preferred indelible marking source including ink, pencil, paint or marker. In the preferred embodiment, the marks 22 are pre-printed on the makeready tape 10.

As FIG. 1 further illustrates, the pre-marked makeready tape 10 is further composed of a bottom side 14 which is coated with an activatable, but not activated adhesive compound. Use of such compounds facilitates the selective activation and adhesion of the pre-marked makeready tape 10 to the roll of continuous webbing 20, an example of which is shown in the preferred embodiment in FIG. 2. Similar attachment is achieved with the interrupted end of the web in instances where the continuous web 18 has been interrupted in the printing process. In the preferred embodiment, the adhesive compound is a commonly produced, commercially available material and is disposed about the bottom side of the pre-marked makeready tape 10 at the time of its production. Alternatively, the pre-marked makeready tape 10 may be secured to the continuous web 18 using other conventional methods which would not damage the printing press, such as adhesive tape, and the like.

Figure 3:
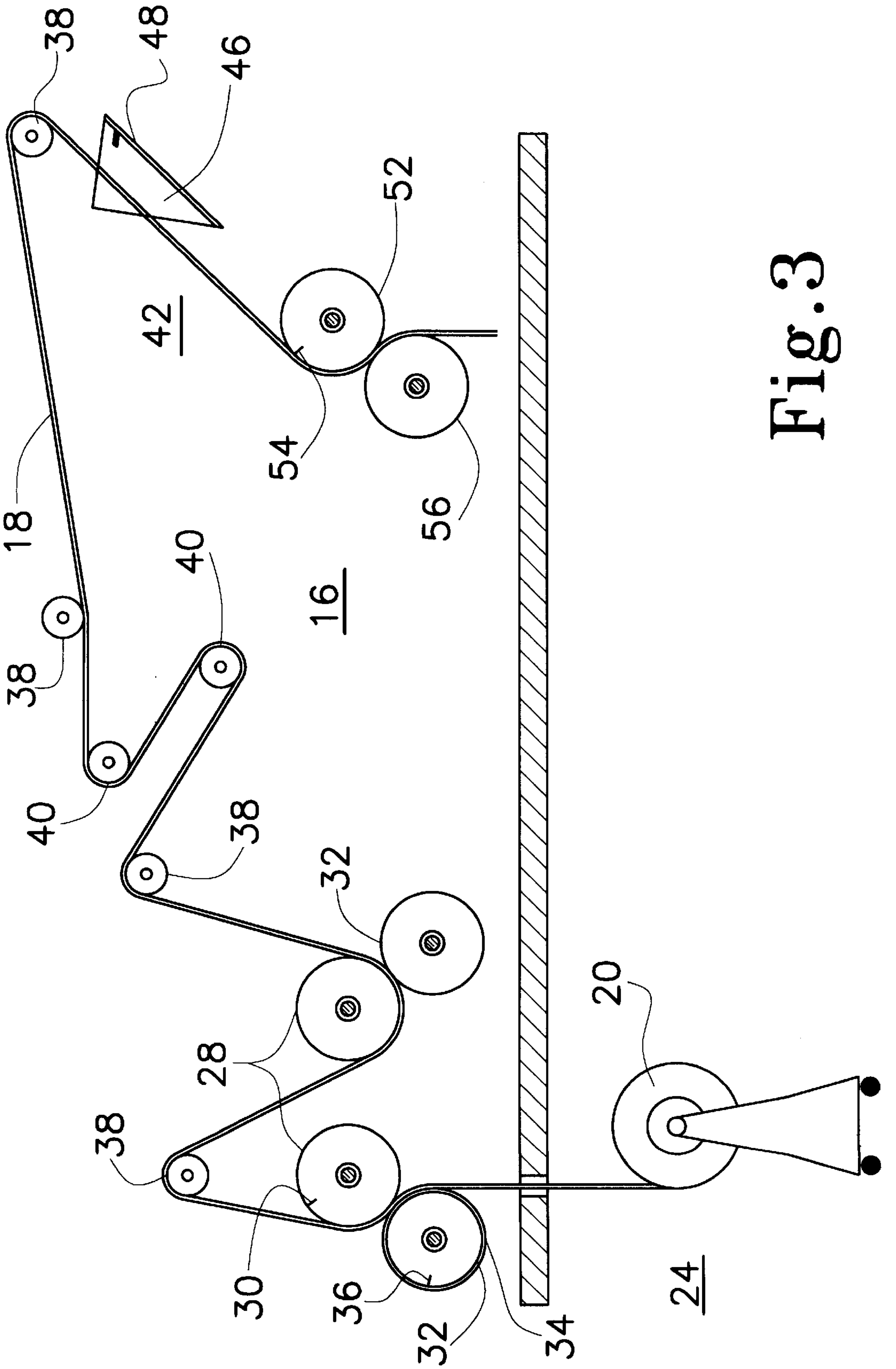
FIG. 3 is a side elevation view of the continuous web printing press showing web extending from a roll of continuous webbing through one print unit, about a roller and through a second print unit, about another roller and through a compensator, about another roller and through the folder, and to the delivery cylinders, the components of the folder all bearing marks as described in the preferred embodiment of the subject invention.

FIG. 3 illustrates a simplified perspective view of the continuous web printing press at 16. In general, this press 16 includes a web roll receiving area 24, for receiving web rolls 20 of various dimensions; at least one impression cylinder 28 and at least one plate cylinder 32, comprising a printing unit, said plate cylinder 32 bearing a magnetic print plate 34 about its circumference, the plate head and tail forming the margin 36; rollers 38 which facilitate continuous web 18 transfer along the print process; at least one compensator 40 which variably adjusts the position of the continuous web 18 within the continuous web printing press 16 by contraction or expansion; and, a folder 42 comprising a former 46, a cutting cylinder 56 and a folding cylinder 52 to turn and cut the continuous webbing 18 into sections and to fold the sections into a printed newspaper and deliver it into delivery cylinders 62 upon completion of the printing process.

Figure 4:
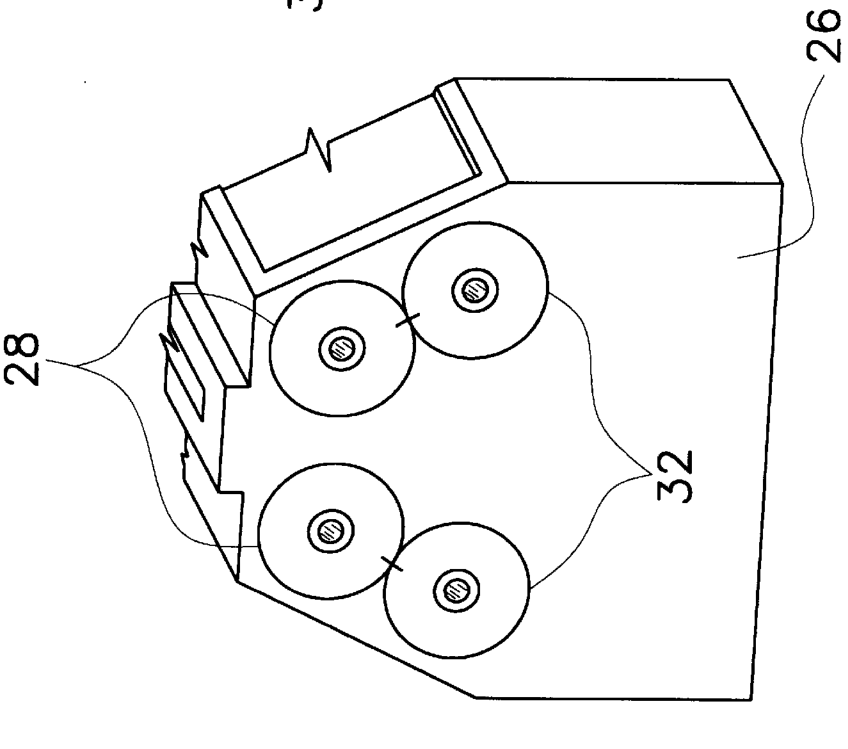
FIG. 4 is an enlarged perspective view of the printing unit of the continuous web printing press which shows the relation of a plate cylinder to an impression cylinder and that of a combination of two pairs of such cylinders to each other in a printing unit.

FIG. 4 is an enlarged view of the printing unit 26. This figure illustrates the relation of a plate cylinder 32 to an impression cylinder 28 and that of two pairs of such cylinders to each other in a printing unit 26.

Figure 5:
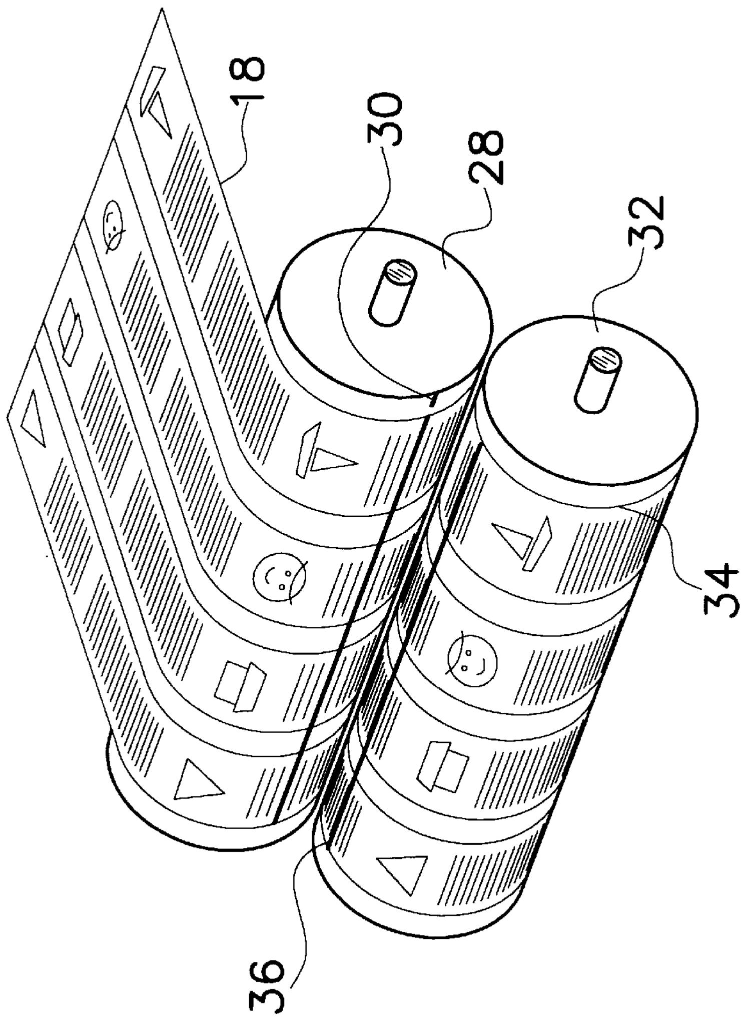
FIG. 5 illustrates a perspective view of a plate and an impression cylinder of the continuous web printing unit, each bearing a plate and a section of printed webbing, respectively.

FIG. 5 illustrates a lateral view of the impression cylinder 28 and plate cylinder 32 of the printing unit 26 which depicts the mark on the impression cylinder 30 corresponding to the margin 36 on the plate cylinder 32.

Figure 6:
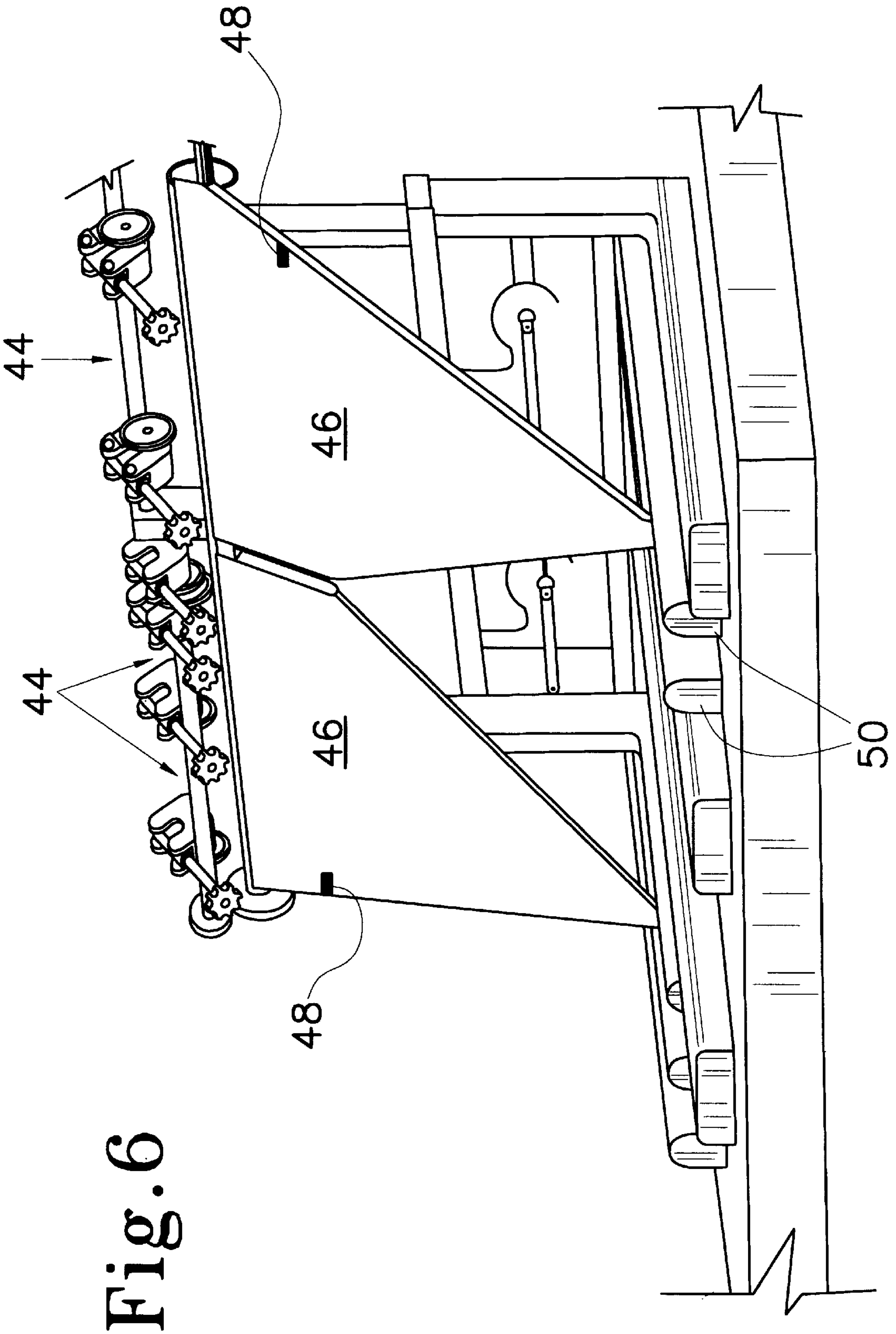
FIG. 6 illustrates a perspective view of the top of the folder showing the roller top of two formers, two formers and the bending rollers, the formers bearing marks for the pre-marked makeready tape as described in the preferred embodiment.

FIG. 6 illustrates a lateral perspective of the top of a folder 42 depicting the roller top 44 of two formers 46, the formers 46 and the bending rollers 50, the formers bearing the marks 48 described in the preferred embodiment.

Figure 7:
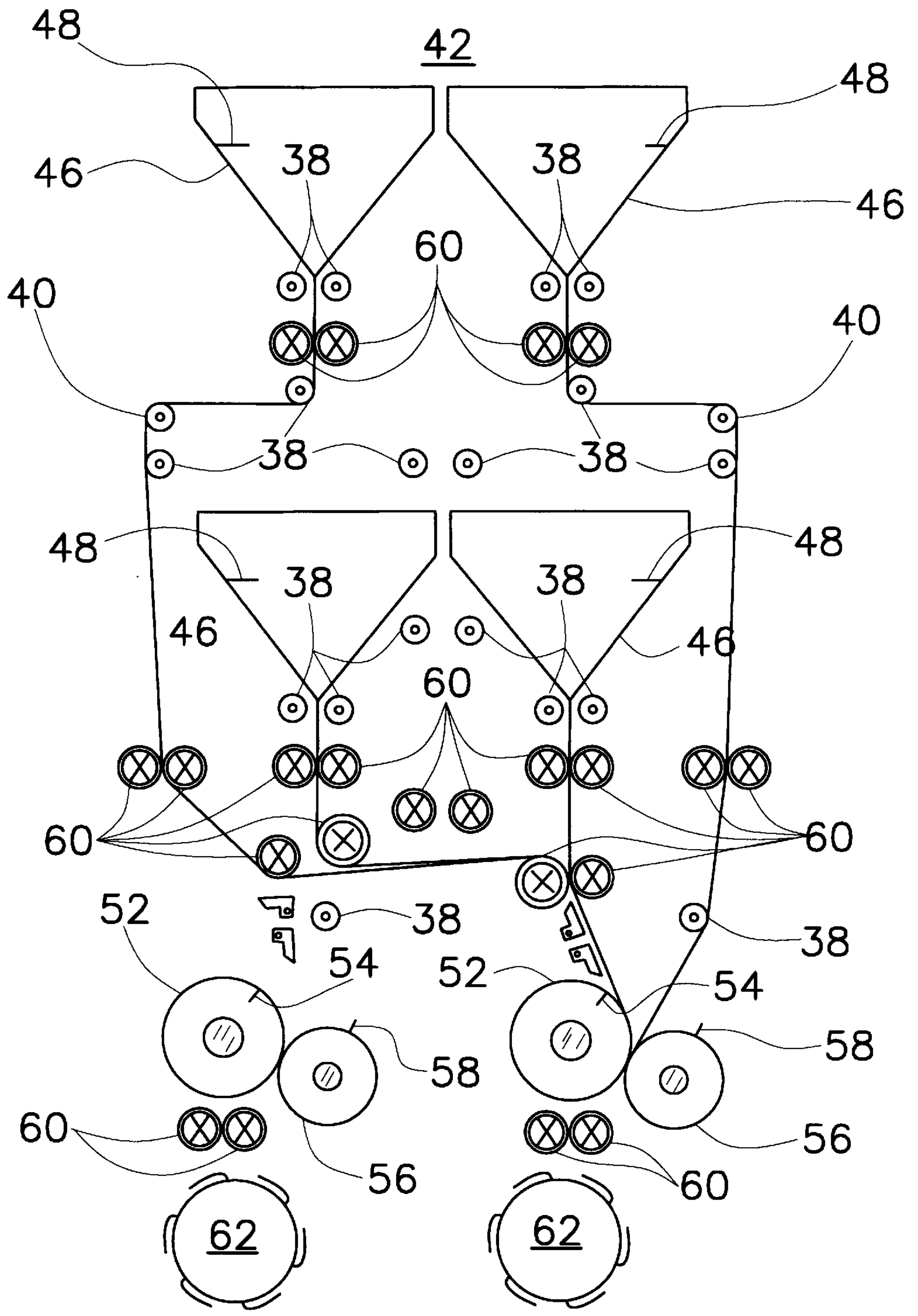
FIG. 7 illustrates a schematic side view of the folder including formers, rollers, driver rollers, compensators, cutting cylinders, folding cylinders and delivery cylinders, the formers and folding cylinders bearing the marks described in the preferred embodiment.

FIG. 7 illustrates a schematic side view of the folder 42 including the formers 46, rollers 38, driver rollers 60, compensators 40, cutting cylinders 56, folding cylinders 52 and delivery cylinders 62, the formers 46 and folding cylinders 52 bearing former marks 48 and folding cylinder marks 54 as described in the preferred embodiment.

It is known by those skilled in the art, that a pressman in the art today uses kraft paper sealing tape to make changes in web-cutoff length somewhere between the printing unit and the folder. In doing so, the pressman leads the tape from the printing unit of the press, around many pipe rollers, angle bars, bay windows and other components of the printing press to the folder. The end of the web near the printing unit is then tapered and approximately four (4) feet of the glue coated underside of the tape is moistened with a cloth or a sponge and is attached to approximately four (4) feet of webbing. The pressman then pulls the tape end near the folder until the fastened web reachers the folder. Once the web is fed to the folder, it is adjusted to insure that there is proper alignment so that the cutters of the printing press will not cut into the image already printed onto the webbing. The method of adjustment currently known in the art includes putting the printing plates into the printing unit, turning on the ink wells, allowing the press to pick up speed to get proper compensation, and compensating the web. In the prior art, compensating the web required repeatedly running the press to produce printed webbing and compensating for any mis-position of the printed images and indicia until they are properly centered on the page of webbing.

In the best mode of the present invention, marks 22 on the continuous web printing press 16 are preferentially disposed on the impression cylinder 28, at a point corresponding to the margin 36 on the plate cylinder 32, and a point on the former 46. The individual marks 22 placed upon the components of the printing press 16 are positioned a whole multiple page length apart along the path of the continuous web 18. The pre-marked makeready tape 10 is threaded through the plate cylinder 32 and the impression cylinder 28 of the printing unit 26, fed about the compensators 40 and passed into the folder 42, including the former 46, this path being the path of the continuous web 18. A mark 22 on the pre-marked makeready tape 10 proximate to the former 46 is first aligned with the mark on the former 46. A mark 22 on the pre-marked makeready tape 10 proximate to the impression cylinder 28 is then aligned to the mark on the impression cylinder 28 by adjustment of the compensators 40, thereby completing the makeready process. Specifically, the compensator 40 is adjusted until the mark 22 closest to the impression cylinder mark 30 is aligned with the impression cylinder mark 30. Ultimately, a portion of the activatable, but non-activated adhesive bottom side of the pre-marked makeready tape is activated and the tape 10 is secured to the continuous web 18 at the printing unit 26, then the webbing is threaded through the continuous web printing press 16 to initiate the printing process. In instances of web 18 interruption, the pre-marked makeready tape 10 is threaded through the continuous web printing press 16 from the point of interruption to the former 46, the above-described steps are repeated as is necessary, depending on the point of interruption. The pre-marked makeready tape 10 is removed from the webbing and the roll of tape such that the next portion of pre-marked makeready tape 10 is available and may be selectively activated to renew the process when required.

From the foregoing description, it will be recognized by those skilled in the art that a pre-marked makeready tape offering advantages over the prior art has been provided. Specifically, the pre-marked makeready tape provides an effective and efficient method for setting continuous web in a continuous web printing press and regulating the position of that web during the printing process to insure that newsprint is being properly and centrally disposed about the web. Moreover, the pre-marked makeready tape provides a quick and efficient means to reset and resume printing in the event of a web break. As such, the pre-marked makeready tape replaces the webbing itself as the tool used calibrate the printing press prior to actually running the print process. The natural and intended benefits of use of this pre-marked makeready tape method includes the reduction misprinted newspaper pages, a corresponding reduction in the use of web and ink raw materials, and a further corresponding reduction in the use and waste of natural resources, all resulting in savings in costs and manpower. Ultimately, and perhaps most importantly, the benefits of this invention include a significant contribution to conservation of the environment.

While a preferred embodiment has been shown and described, it will be understood that it is not intended to limit the disclosure, but rather is intended to cover all modifications and alternate methods falling within the spirit and the scope of the invention as defined in the appended claims.

Having thus described the aforementioned invention,

I claim:

1. A pre-marked makeready tape for use in setting and regulating a selected position of webbing on a continuous web printing press having at least one printing unit, at least one compensator and at least one folder, said pre-marked makeready tape comprising:

a tape adapted for defining a path of a continuous web during a makeready process, wherein said tape is fabricated from a durable material having a top side and a bottom side and a terminal end securable to an end of the webbing;

an activatable, but non-activated, adhesive member for securing an end of said tape to an end of the continuous web, said adhesive member being disposed on said bottom side of said tape whereby a portion of said activatable, but non-activated, adhesive member is selectively activated for securing a selected length of said terminal end of said tape to the end of the webbing; and indicia disposed about said top side of said pre-marked makeready tape defining at least a first mark and a second mark spaced apart a distance equal to a whole multiple of a page length of printed matter, said indicia being adapted for aligning said first mark on said pre-marked makeready tape with a first location on the continuous web printing press proximate to the path defined by said make-ready tape on a first side of the compensator and adjusting the compensator to align said second mark on said pre-marked makeready tape with a second location on the continuous web printing press proximate to the path defined by said make-ready tape on a further side of the compensator whereby a selected position of the continuous web on the continuous web printing press is set and regulated.

2. The pre-marked makeready tape of claim 1 wherein said tape is cloth.

3. The pre-marked makeready tape of claim 1 wherein said tape is paper.

4. The pre-marked makeready tape of claim 1 wherein said tape is plastic.

5. The pre-marked makeready tape of claim 1 wherein said activatable, but non-activated adhesive member substantially coats said bottom side of said tape.

6. A pre-marked makeready tape for use in setting and regulating a selected position of webbing on a continuous web printing press having at least one printing unit, at least one compensator and at least one folder, said pre-marked makeready tape comprising:

a tape adapted for defining a path of a continuous web during a makeready process, wherein said tape is fabricated from paper having a top side and a bottom side and a terminal end securable to an end of the webbing;

an activatable, but non-activated, adhesive member for securing an end of said tape to an end of the continuous web, said adhesive member being disposed on a substantial portion of said bottom side of said tape whereby a portion of said activatable, but non-activated, adhesive member is selectively activated for securing a selected length of said terminal end of said tape to the end of the webbing; and indicia disposed about said top side of said pre-marked makeready tape defining at least a first mark and a second mark spaced apart a distance equal to a whole multiple of a page length of printed matter, said indicia being adapted for aligning said first mark on said pre-marked makeready tape with a first location on the continuous web printing press proximate to the path defined by said make-ready tape on a first side of the compensator and adjusting the compensator to align said second mark on said pre-marked makeready tape with a second location on the continuous web printing press proximate to the path defined by said make-ready tape on a further side of the compensator whereby a selected position of the continuous web on the continuous web printing press is set and regulated.

7. A pre-marked makeready tape for use in a continuous web printing press during a makeready process, the continuous web printing press having at least one printing unit, at least one compensator and at least one folder, said pre-marked makeready tape comprising:

elongated tape means for setting and regulating a selected position of webbing on a continuous web printing press and for defining a path of a continuous web during a makeready process, said elongated tape means having a top side and a bottom side;

adhesive means for securing an end of said pre-marked makeready tape to an end of the continuous web, said adhesive means being activatable, but non-activated and further being disposed on said bottom side of said elongated tape means; and first indicia means printed on said top side of said elongated tape member for aligning said pre-marked makeready tape with a first location on the continuous web printing press proximate to the path defined by said make-ready tape on a first side of the compensator and adjusting the compensator; and second indicia means printed on said top side of said elongated tape member for aligning said pre-marked makeready tape with a second location on the continuous web printing press proximate to the path defined by said make-ready tape on a further side of the compensator, wherein said first and second indicia means are disposed on said top side of said pre-marked makeready tape and are spaced apart a distance equal to a whole multiple of a page length of printed matter.

8. The pre-marked makeready tape of claim 7 wherein said elongated tape means is defined by an elongated cloth tape member.

9. The pre-marked makeready tape of claim 7 wherein said elongated tape means is defined by an elongated paper tape member.

10. The pre-marked makeready tape of claim 7 wherein said elongated tape means is defined by an elongated plastic tape member.

11. The pre-marked makeready tape of claim 7 wherein said activatable, but non-activated adhesive means substantially coats said bottom side of said elongated tape means.

* * * * *